United States Patent [19]
Canfield

[11] 4,206,164
[45] Jun. 3, 1980

[54] METHOD AND APPARATUS FOR MAINTAINING THE CONCENTRICITY OF A MOLDED PIPE

[75] Inventor: Sheldon A. Canfield, Newark, Ohio

[73] Assignee: Owens-Corning Fiberglas Corporation, Toledo, Ohio

[21] Appl. No.: 954,491

[22] Filed: Oct. 25, 1978

[51] Int. Cl.² .............................................. B29D 27/04
[52] U.S. Cl. ................................ 264/40.2; 264/46.2; 264/46.9; 425/141; 425/259; 425/817 C
[58] Field of Search .................... 264/40.1, 40.2, 46.9, 264/45.8, 46.2; 425/4 C, 141, 259, 817 C

[56] References Cited
U.S. PATENT DOCUMENTS

| | | | |
|---|---|---|---|
| 2,820,987 | 1/1958 | Bunch | 264/40.2 |
| 3,159,786 | 12/1964 | Bayne | 264/40.2 X |
| 3,288,895 | 11/1966 | Windeler | 264/40.2 |
| 3,459,851 | 8/1969 | MacPherson | 264/40.2 |
| 3,748,577 | 7/1973 | Jones | 264/40.2 X |
| 3,754,064 | 8/1973 | Snelling et al. | 425/4 C X |
| 3,816,043 | 6/1974 | Snelling et al. | 425/4 C |
| 3,914,357 | 10/1975 | Cereijo et al. | 264/40.2 |
| 3,985,483 | 10/1976 | Clay et al. | 264/46.9 X |

Primary Examiner—Philip Anderson
Attorney, Agent, or Firm—Ronald C. Hudgens; Patrick P. Pacella; Oliver E. Todd, Jr.

[57] ABSTRACT

A pipe insulation is made between an inner and outer mold core from a liquid which foams and then forms a solid. The foaming action may cause movement in the inner mold which is detected and then adjusted accordingly to maintain concentricity between the inner and the outer wall of the pipe insulation. The insulation may be used alternatively as pipe.

7 Claims, 5 Drawing Figures

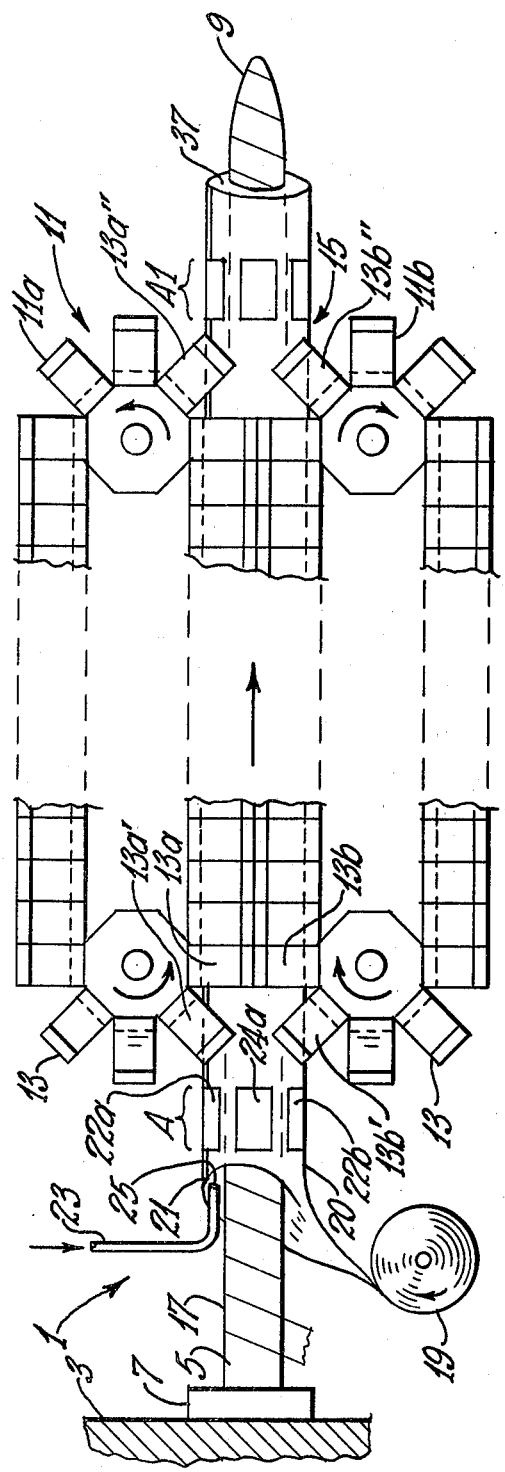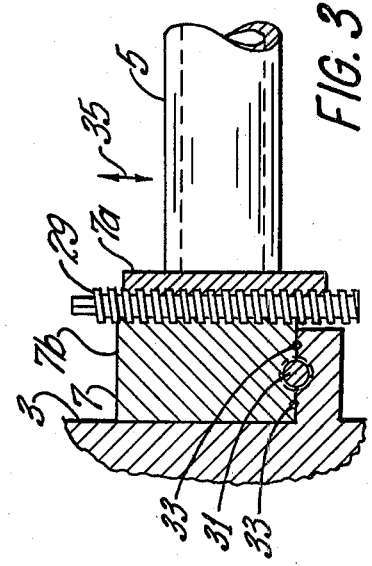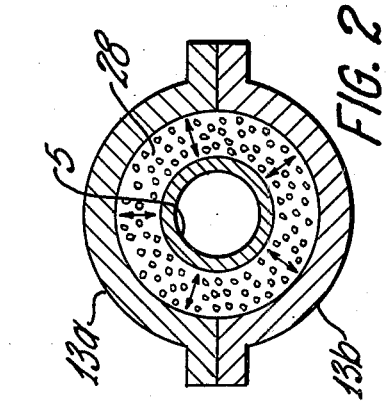

METHOD AND APPARATUS FOR MAINTAINING THE CONCENTRICITY OF A MOLDED PIPE

FIELD OF THE INVENTION

This invention relates to the field of forming solid foamed resin materials within a mold from a liquid which changes from a liquid state to a solid foamed state.

BACKGROUND OF THE INVENTION

In forming materials such as pipe insulation from liquids which transform themselves to a solid, undergoing a transitory foam state, it has been found that the material within the foam state places forces on the mold, in some instances displacing the mold from a set position.

This movement within the mold causes distortion in the product. In the case of pipe insulation, an inner mold is mounted within the outer mold and the liquid is inserted therebetween. During the foaming process, forces exerted on the inner mold may displace the inner mold from its centered position causing a distortion in the concentricity between the inner wall of the finished pipe and the outer wall.

A machine for making pipe insulation from an injected liquid and upon which this invention may be practiced is shown in U.S. Pat. No. 3,985,483.

SUMMARY OF THE INVENTION

This invention provides a means for determining the concentricity of the inner and outer wall of pipe insulation formed from a foaming liquid. This determination is accomplished by measuring the wall thickness between the inner wall and the outer wall of the pipe at two locations. Two separate measurements are taken, a first measurement being the wall thickness of diametrically opposed inner and outer wall sections, and a second measurement of two other diametrically opposed inner and outer wall sections, with the second wall sections displaced 90 degrees from the first all sections.

This measurement is made by means of electrically conductive plates mounted about the periphery of the pipe insulation on the outer wall and by inner plates mounted on the mandrel or by the mandrel itself. The capacitance difference between the opposed wall sections is measured to determine the wall thicknesses, and the inner mold is adjusted to reduce the capacitive difference to zero.

According to this invention, separate plates may be mounted corresponding to a separate respective capacitor on the outer wall, and the inner plate may be in common with each capacitor. The mandrel may serve as the common inner capacitive plate cooperating with each respective outer plate.

A detector is located within the mandrel but adjacent the capacitive plates. The detector responsive to the signal produced by each capacitor provides a signal of the capacitance difference and indicates the wall thickness between the two sets of capacitive plates in diametrically opposed pipe insulation sections. Additionally, to this purpose oscillators may provide first and second signals at separate frequencies to excite capacitors displaced about the pipe insulation by 90° and the detector then provides responsive DC signals indicative of the respective capacitance differences.

In one embodiment of this invention, the plates forming a part of each capacitor are held against the outer wall adjacent the area where the liquid is injected and at the area where the foaming action is expected. In another embodiment of this invention, the outer plates forming a part of each capacitor are held against the outer wall at a point where the foam material has been transformed into a solid.

The capacitive plates are mounted adjacent the pipe insulation and the signal produced is indicative of a capacitance between the plates and the wall thicknesses between the respective sets of plates. For the pipe insulation to be concentric, the signals from the capacitors have to be substantially equal and the difference signal substantially zero. A controller is provided with the difference signals, and provides a control signal to the inner mold mounting, to move the mounting in response to the signals and reduce the difference signal to zero.

A machine for making pipe insulation from an injected liquid and upon which this invention may be practiced is shown in U.S. Pat. No. 3,985,483.

The pipe insulation is continuously formed and then cut along its length to facilitate installation. It therefore may be used as a pipe when in its uncut state and the principles of this invention may be used in the formation of continuously molded pipe as well as continuous molded pipe insulation.

DESCRIPTION OF THE DRAWINGS

FIG. 1 is a fragmentary view of a pipe molding machine and the location of the measuring device on the machine.

FIG. 2 shows the mold and pipe in cross-section.

FIG. 3 shows the inner mold mounting and means for moving the inner mold in response to the detector controller output signals.

DESCRIPTION OF THE PREFERRED EMBODIMENT

Figure 4:
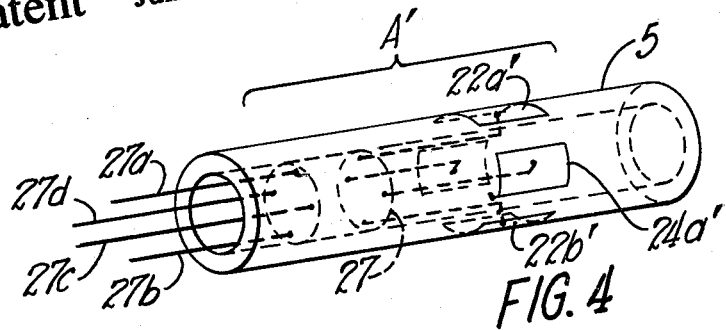
FIG. 4 shows a partial perspective view of the inner mold.

Referring now to the drawings, the preferred embodiment is described.

As shown in FIG. 1, a pipe insulation molding machine for use with the invention is shown generally by numeral 1 and corresponds generally to the machine shown in U.S. Pat. No. 3,985,483. However, it should be understood that the principles of this invention can be used in continuously forming pipe as well as pipe insulation, where the pipe is used in its uncut state, as explained above. A stationary mounting 3 supports a mandrel 5 which is connected to said stationary mounting 3 by an adjustable mounting 7 as will be described with reference to FIG. 3. The mandrel 5 is in the shape of an elongated cylinder having an end shown at 9. The molding device includes the caterpiller apparatus 11 shown as having upper and lower portions 11a and 11b. A middle section is shown in phantom. The individual plates are shown in cross-section in FIG. 2 and include upper and lower halves 13a and 13b. As shown, as the caterpillar mechanism rotates in the direction shown by the arrows, and the plates 13 are moved in a direction of the arrows, the caterpillar mechanism staying stationary.

As seen in FIG. 1, plate 13a and 13b have been driven into a contiguous relationship to form the mold for the outer surface of the pipe or pipe insulation. In this regard the references to "pipe" below should be understood to refer to pipe insulation as well. Also as shown in FIG. 1, two new sections are next being brought into a contiguous relationship to form a next portion of the mold, these sections being immediately to the left of 13a and 13b and indicated by 13a' and 13b'. As shown, the caterpillar mechanism disengages the mold plates from the exterior of the pipe at end 15 of the caterpillar travel, the plates 13a" and 13b" are disengaged from the mold and returned again to the beginning of the mold in the continuous process.

The mandrel 5 is wrapped with a paper release agent 17. The outer mold of the mandrel is formed from paper roll 19 which is wrapped about the mandrel in a continuous fashion and with a seam fastened at 21 by a suitable mechanism known in the art. The liquid is injected through conduit 23 and injected into the outer mold at outlet 25. The liquid begins its foaming action, as the outer mold is carried by the plates 13 of the caterpillar in a direction shown by the arrows. This movement by the caterpillar plates 13 of the outer mold draws the outer mold material off the supply roller 19 forming the outer mold about the mandrel in a continuous process at the injection port 25 of the liquid.

The state of the foamed material is shown in FIG. 2 by 28. As the material foams, and until the foam solidifies, the foaming action produces forces on the outer mold and on the mandrel as shown by the arrows within FIG. 1 displacing the mandrel and distorting the concentricity of the inner and outer walls.

The foamed material solidifies within the outer mold formed by the caterpillar plates 13 and is ejected at the output port 15 of the caterpillar as a solid pipe.

Shown in FIG. 3, one end of the mandrel is mounted on movable mount 7 which may be displaced in at least two directions by screw 29 shown in cross-section and screw 31 shown in end view. The mount 7 is shown in cross-section. An appropriate driver (not shown) may be applied to screw 29 and screw 31 to displace the mandrel from the solid support 3 in at least two axial directions and compensate for movement of the mandrel produced by the forces of the foaming liquid within the outer mold. As shown in cross-section, pins 33 permit movement of the mounting in a direction in and out of the plane of the paper.

The means for detecting a condition of non-concentricity in the walls of the pipe is shown within bracket A and A1 of FIG. 1 and in detail in FIG. 4.

It should be understood that the means for determining wall thickness are shown in a first location A and in an alternate location A1. The said means comprises a series of plates that cooperate with the mandrel and form a series of capacitances to detect the electrical transmission properties through the pipe at its foamed portion.

As shown within the bracketed area A of FIG. 1, a series of plates are displaced around the outer mold 20.

A pair of diametrically opposed outer plates 22a and 22b formed a complete sensor for detecting the concentricity of the pipe when combined with a suitable detector and inner plates as will be further shown.

Additional plate 24a cooperate with a second plate 24b (not shown) on the opposite side of the mold 20. In the preferred embodiment shown, concentricity is measured between two diametrically opposed pipe walls by plates 22a and 22b and the cooperating inner plates and by plates 24a and 24b and the cooperating inner plates. However, it should be understood that the concentricity can be measured between walls which are displaced less than 180° apart and may be displaced between walls 90° apart. For example, the concentricity could be measured using plate pair 24a and 22a to measure the concentricity of the points along the pipe displaced 90° from each other.

Referring to FIG. 4, the detector 27 is shown mounted within the mandrel 5. As shown within section A, inner plates 22a' and 22b' are shown mounted on the mandrel cooperating with plates 22a and 22b respectively of FIG. 1. Plate 22a' cooperates with the plate 22a and the foamed material dielectric therebetween as a first capacitor. Plate 22b' cooperates with plate 22b and the foamed material dielectric therebetween as a second capacitor. A detector 27 is located inside the mandrel adjacent the capacitors to limit interference to the measurements. Appropriately, detector output lines 27a, 27b, 27c and 27d provide DC signals having a polarity and magnitude indicating the capacitance difference of each capacitive unit. In this case, as shown in FIG. 4, two pair of outputs are shown, 27a, and 27b which provide DC signal having a magnitude and polarity indicative of the capacitive difference between the capacitors of plates 22a and 22a' and 22b and 22b'. Similarily, outputs leads 27c and 27d would provide a DC signal having a voltage magnitude and polarity indicative of the compacitive difference between capacitors of plates 24a and 24a' and 24b and 24b'. The connection of the detector to the capacitive pairs is schematically shown in FIG. 5 but with the mandrel body 5 substituted as a common inner capactive plate for plates 22a', 22b', 24a' and 24b'.

As stated above, separate plates may be mounted on the mandrel to cooperate respectively with opposed plates on the outside of the pipe wall. Alternatively, a mandrel may be connected as a common capacitive plate cooperating individually with discrete capacitive plates on the pipe wall forming separate discrete capacitors as shown in FIG. 5.

Figure 5:
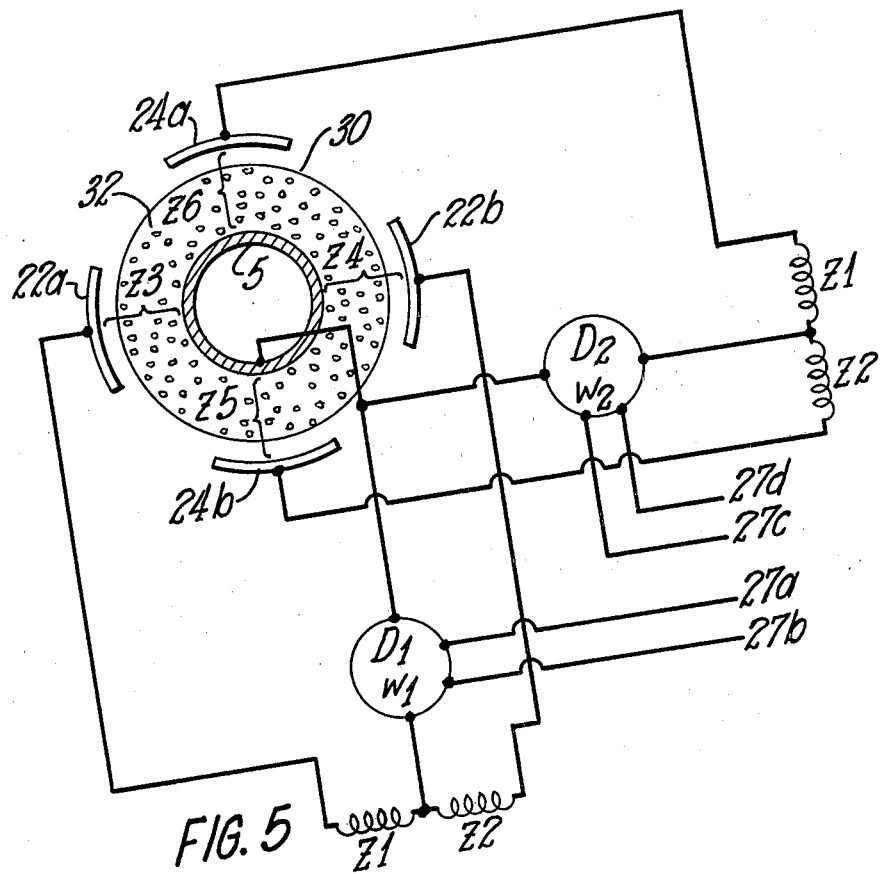
FIG. 5 shows the concentricity detector in schematic form.

As shown in FIG. 5, concentricity is measured between capacitors displaced 180° on opposite sides of the outer pipe wall 30. The mandrel functions in the same way as does inner plate 22a' cooperating with outer plate 22a to form a first capacitor through the dielectric material of the foamed pipe 32 and as does the plate 22b' cooperating without a plate 22b through the dielectric material of the foam pipe 32 to form a second capacitor. The first and second capacitors formed of the plate 22a and the mandrel 5 and plate 22b and the mandrel 5 have impedences Z3 and Z4 respectively at the excitation frequency $w_1$. As shown, the two capacitors represented by impedances Z3 and Z4 are connected as a bridge cooperating with fixed impedances Z1 and Z2. When capacitance Z3 equals Z4, no current flows through the detector D and the output at 27a and 27b is zero. However, when there is a lack of concentricity in the outer pipe wall 30, the wall thickness between capacitor plate 22a and mandrel 5 will be different from the wall thickness between capacitor plate 22b and mandrel 5, and the result will be a capacitive difference and an impedance difference between Z3 and Z4. This difference will force current flow through the detector with a magnitude proportionate to the difference in capacitance and in a direction responsive to the relative magnitude of Z3 and Z4.

A detector which may be used in this instance is—the Motorola MC1494 connected as a phase sensitive detector.

The circuit shown in FIG. 5 is inherently balanced against adverse affects of stray capacitance. Stray capacitance to ground will appear to varying degrees from the connection between Z1 and the plate 22a, from the connection between Z2 and the plate 22b, and from the connection between Z1 and Z2 to the detector D1, however, the circuit operates such that the capcitances formed by the impendances Z3 and Z4 define a voltage divider. Any stray capacitance to ground merely increases the load on the excitation signal without changing the relative voltages across Z3 and Z4. Therefore, extensive and expensive shielding is unnecessary to obtain an accurate concentricity measurement. A similar measurement accuracy is obtained for the impedances Z5 and Z6 without shielding.

In a similar manner, the mandrel 5 may serve as a common inner plate for capacitors formed by the mandrel plate 24a, and the dielectric material of the foamed pipe insulation therebetween and the capacitor formed by 24b, and the dielectric material of the foamed pipe insulation therebetween.

In this case, as in the case of the capacitors formed of plates 24a and 24b, the mandrel 5 functions as the inner plate 24a' and 24b' in the same manner as shown with respect to the inner plates 22a' and 22b' as shown in FIG. 4. A second bridge is formed having fixed impedences of Z1 and Z2 and impedence Z6 for the capacitor pair of 24a and the mandrel and Z5 for the capacitance pair of 24b and the mandrel respectively at the excitation frequence W2. Through the use of two distince excitation frequencies W1 and W2, the pair of capacitors formed by the mandrel 5 and the plates 22a and 22b can be placed at the same axial location on the formed pipe as the pair of capacitors formed by the mandrel 5 and the plates 24a and 24b without signal interference. A detector D2 provides an output signal at 27c and 27d as in the case of detector D1 having a voltage magnitude proportional to the difference in capacitance and impedence of Z5 and Z6 and with polarity indicative of the relative magnitude of Z5 and Z6. As in the case of diametrically opposed capacitors 22a and 22b, a lack of concentricity will be shown as an impedance difference between Z5 and Z6 with concentricity shown as a zero impedance difference between Z5 and Z6 and a zero signal of the output terminals 27c and 27d. As in the case of D a suitable detector or D2 would be the MC1494.

Also, as a variation of this embodiment, other embodiments may use outer plates which are arranged about the periphery of the pipe wall displaced at angles other then 180°. For example, where concentricity is to be determined between two points in the pipe arranged 90° from each other, the capacitive pairs formed of plates 24b and 22b and the common inner plate of the mandrel could be used.

As shown in FIG. 1, a pipe with an outer mold is pulled through to the right by the caterpillar mechanism 13 and ejected at the output 15. As shown in FIG. 1, the end of the pipe 37 is shown as nearing the end of the mandrel 9. As this is a continuous process, the end 37 will gradually extend out beyond the mandrel to a delivery point where the pipe can be sectioned and removed from the machine.

A suitable mechanism for adjusting the position of the mandrel relative to the signal sent by the detectors as shown in FIG. 3. This is merely illustrative and is not shown to be exhaustive of the various means of adjusting the mandrel. A mandrel 5 is mounted in an adjustable mounting 7 which has two degrees of freedom 90° apart from each other. A first degree of freedom is in the plane of the paper controlled by screw thread 29 which cooperates with portion 7a and portion 7b of the mounting. As can be seen, rotation of screw 29 will move the mandrel in the direction of a plane in the paper as shown by the arrows 35. A second screw 31 is shown in cross-section going into the plane of the paper and rotation of that screw 31 moves the mandrel 5 in a direction perpendicular to the plane of the paper. Locating pins 33 are shown to support movement of the mounting into and out of the plane of the paper.

A controller (not shown) receives the signal outputs at terminals 27a through 27d and proportional to the voltage and polarity magnitudes, applies respective signals to the drivers (not shown) for screw threads 29 and 31 turning the screw threads to make the suitable adjustments as is well known in the art until the respective capacitive differences are zero. In this case, screw thread 29 would be rotated by the controller until the capacitive difference between the capacitor pair represented by plates 22a and 22b are zero as indicated by a zero output signal at 27a and 27b.

Similarly, the controller response to the signal output at terminals 27c and 27d would adjust screw 31 through its driver until the compacitive difference to drive to zero the output at terminals 27c and 27d. The manner of this type of control is well known in the art and need not be explained here.

Separate and distinct signals may be produced from the common detector located inside the mandrel as shown in FIG. 4 and with the mandrel used as a common inner capacitor plate for each of the separate capacitors displaced about the outside of the pipe by exciting each detector with a separate frequency and detecting each frequency separately. In this case, detector D1 is excited with frequency W1 detector D2 is excited with frequency W2. These techniques are well-known in the art and are not discussed in detail.

I claim:

1. A method for maintaining a predetermined concentricity of a substantially circular foamed resin pipe molded between an inner mold and an outer mold each of said molds having a lining, comprising the steps of injecting a foamable resin material between the inner and outer lined molds to form said molded pipe, providing a plurality of electrical capacitors at an axially fixed location on said formed downstream of said resin material injection, said capacitors including a plurality of isolated capacitor plates on one of said linings and a common plate on the other of said linings pipe with circumferentially spaced areas on the wall of said formed pipe defining the dialectrics for said capacitors, applying an excitation voltage having a preselected frequency to two of said capacitors, detecting a voltage difference on said two capacitors, and adjusting said molds in response to the detected voltage difference to maintain said predetermined concentricity.

2. A method for maintaining a predetermined concentricity of a substantially circular pipe molded between an inner mold and an outer mold, as set forth in claim 1, wherein said excitation voltage is applied to a first two of said capacitors formed 180° apart about the pipe axis, and further including the step of applying a second excitation voltage having a different preselected frequency to a second two of said capacitors formed 180° apart and spaced 90° from said first two capacitors about the pipe axis, detecting a second voltage difference on said second two capacitors, and adjusting said molds in response to said detected second voltage difference to maintain said predetermined concentricity.

3. Apparatus for producing a foamed resin molded pipe comprising an inner mold, an outer mold surrounding at least a portion of said inner mold to define an open ended mold cavity, means to provide linings for said inner and outer molds means for injecting a foamable resin material into said lined mold cavity to continuously mold said pipe, means defining a plurality of electrical capacitors spaced circumferentially about said molded pipe at a predetermined point on the axis of said molded pipe downstream of said injecting means, said capacitors defining means including a plurality of isolated capacitor plates on one of said linings and a common plate on the other of said linings with the adjacent wall portions of said molded pipe forming the dialectrics for said capacitors, said common plate connecting a first and a second of said capacitors electrically in series, means for applying an excitation voltage having a preselected frequency across said series first and second capacitors whereby said first and second capacitors form a voltage divider, detector means for comparing the relative voltages on said first and second capacitors, and means responsive to said detector means for adjusting said inner and outer molds to obtain a predetermined ratio of the pipe wall portions forming the dialectrics for said first and second capacitors.

4. Apparatus for producing molded pipe, as set forth in claim 3, wherein said common plate connects a third and a fourth of said capacitors electrically in series, and further including means for applying an excitation voltage having a different preselected frequency across said series third and fourth capacitors whereby said third and fourth capacitors form a voltage divider, second detector means for comparing the relative voltages on said third and fourth capacitors, and means responsive to said second detector means for adjusting said inner and outer molds to obtain a predetermined ratio of the pipe wall portions forming the dialectrics for said third and fourth capacitors.

5. Apparatus for producing a molded pipe, as set forth in claim 4, wherein said first and second capacitors are spaced substantially 180° apart about the axis of said molded pipe, wherein said third and fourth capacitors are spaced substantially 180° apart about the axis of said molded pipe, and wherein said third and fourth capacitors are spaced substantially 90° from said first and second capacitors about the axis of the molded pipe.

6. Apparatus for producing a molded pipe, as set forth in claim 5, and further including a first conductor having two end terminals separately connected to said isolated capacitor plates of said first and second capacitors and having a first center tap, a second inductor having end terminals separately connected to said isolated capacitor plates of said third and fourth capacitors and having a second center tap, wherein said first excitation voltage applying means and said first detector means are connected between said common plate and said first center tap, and wherein said second excitation voltage applying means and said second detector means are connected between said common plate and said second center tap.

7. Apparatus for producing a molded pipe, as set forth in claim 3, where said common plate comprises a separate plate for each of said capacitors and means electrically interconnecting said separate plates, further including an inductor having a first end terminal connected to said isolated plate of said first capacitor, a second end terminal connected to said isolated plate of said second capacitor and having a tap, and wherein said excitation voltage applying means and said detector means are connected between said common plate and said tap.

* * * * *